United States Patent [19]

Nelson

[11] Patent Number: 4,481,714
[45] Date of Patent: Nov. 13, 1984

[54] AUTOMATIC PIPE TALLY DEVICE

[76] Inventor: Stephen C. Nelson, 407 McKelvey Ave., Bakersfield, Calif. 93308

[21] Appl. No.: 462,366

[22] Filed: Jan. 31, 1983

[51] Int. Cl.³ .............................................. G01B 5/04
[52] U.S. Cl. .................................... 33/141 R; 33/142; 33/129; 33/134 R
[58] Field of Search ............. 33/141 R, 141 E, 141 G, 33/142, 147 L, 134 R, 129, 132 R, 133

[56] References Cited

U.S. PATENT DOCUMENTS

| | | | |
|---|---|---|---|
| 2,663,598 | 12/1953 | Verderber | 33/141 B |
| 3,318,005 | 5/1967 | Petersen | 33/141 R |
| 3,436,954 | 4/1969 | Eppler | 33/129 |
| 3,568,485 | 3/1971 | Mandula | 33/147 L |
| 4,205,447 | 6/1980 | Smith | 33/129 |

Primary Examiner—Willis Little

[57] ABSTRACT

This device is designed to measure oil well tubing automatically, as it is lowered or raised in an oil well casing, without manually monitoring the tubing. Primarily, it consists of a base or mounting plate, through which will pass the tubing that is being measured. It also includes a plurality of wheel and shaft mechanisms mounted to the base or mounting plate, for bearing against the tubing. It further includes a pair of gear driven footage counters, to count the feet of pipe being lowered or raised.

2 Claims, 6 Drawing Figures

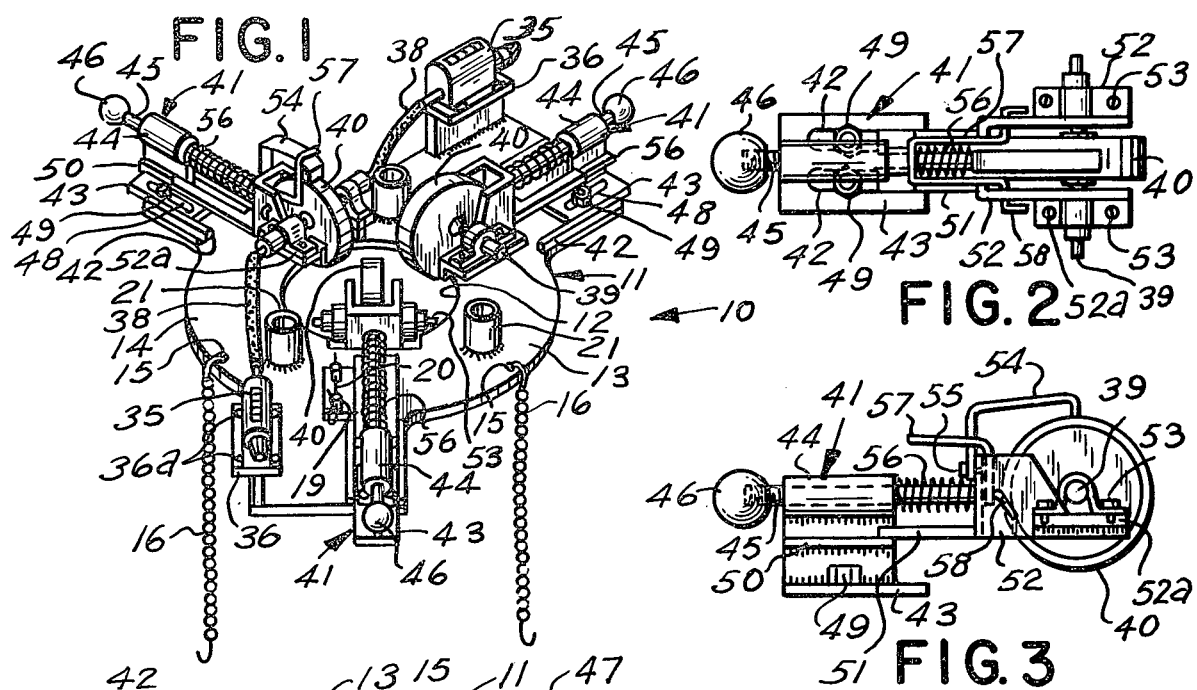
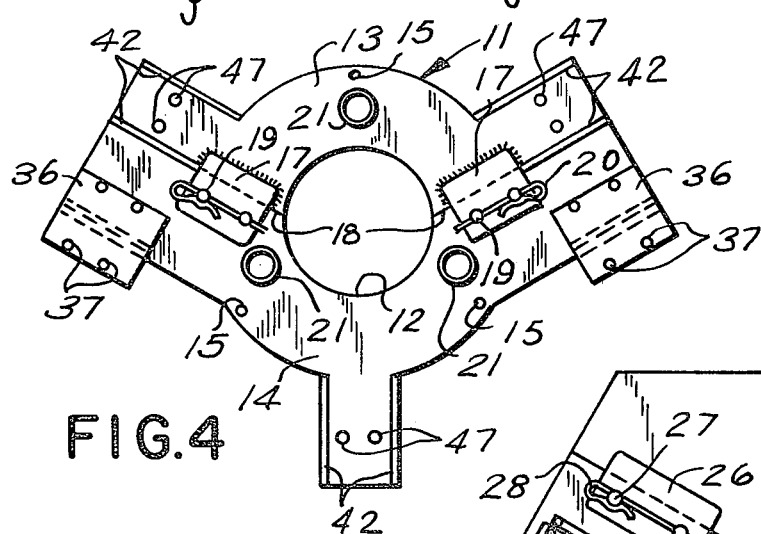
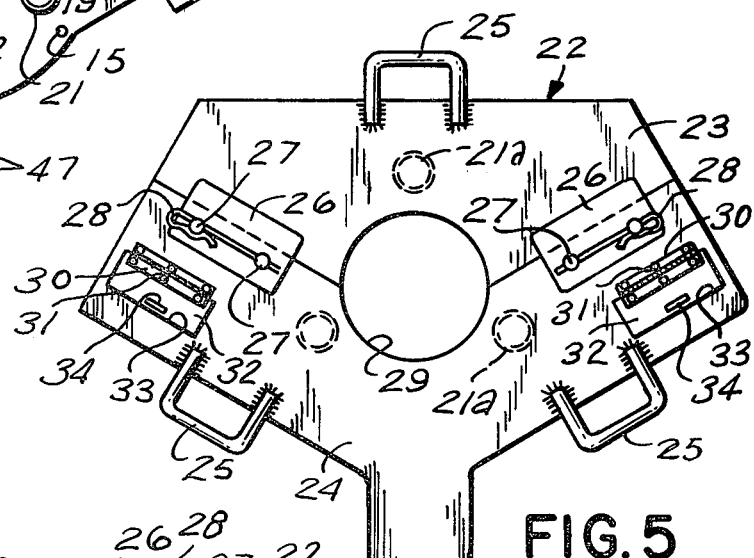
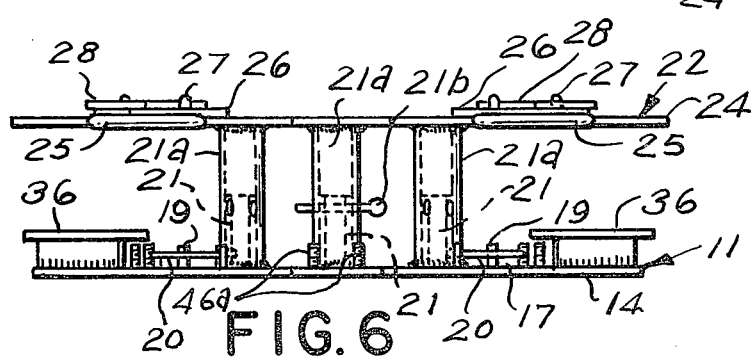

AUTOMATIC PIPE TALLY DEVICE

This invention relates to measuring devices, and more particularly, to an automatic pipe tally device.

The principal object of this invention is to provide an automatic pipe tally device, which will be unique, in that it will measure oil well tubing as it is lowered or elevated in the bore of an oil well.

Another object of this invention is to provide an automatic pipe tally device, which will measure oil well tubing as it is lowered or elevated, with the use of a conventional oil field pulling rig. In the prior art, tubing was hand measured at each joint, either before lowering into the well bore or casing, or as the tubing was lifted out of the well bore. In either case, this was a three man operation, requiring many man-hours and lost rig working time to accomplish such, especially in deep holes.

Another object of this invention is to provide an automatic pipe tally device, which, once attached to the string of tubing, a measuring wheel of its assembly will drive the footage counter, and measure continuously, giving total footage count at all times.

A further object of this invention is to provide an automatic pipe tally device, which will include one counter for measuring as the tubing is lowered, and a second counter to measure as the tubing is being raised, and the device is so designed, as to sit directly on the pulling rig slips, and does not interfere with any of the operations required by the oil rig operators.

A still further object of this invention is to provide an automatic pipe tally device, which will not be limited to oil well tubing, but, with a few minor modifications, may be employed to measure other downhole pipe, such as drill pipe, casing, etc.

An even further object of this invention is to provide an automatic pipe tally device, which will be of such design, as to include both adding and subtracting functions in both counters of the device.

Other objects are to provide an automatic pipe tally device, which is simple in design, inexpensive to manufacture, rugged in construction, easy to use, and efficient in operation.

These, and other objects, will be readily evident, upon a study of the following specification, and the accompanying drawing, wherein:

FIG. 1 is a perspective view of the present invention, showing the top protector plate removed therefrom;

FIG. 2 is an enlarged top plan view of one of the wheel and shaft mechanisms of the main assembly;

FIG. 3 is a side elevational view of FIG. 2;

FIG. 4 is a top plan view of the mounting plate of the assembly, showing the wheel and shaft mechanisms removed therefrom;

FIG. 5 is a top plan view of the top protector plate, which is shown removed from FIG. 1, for the sake of clarity, and FIG. 6 is a front elevational view of the top protector plate and mounting plate of the main assembly, shown secured together, with the wheel and shaft mechanisms removed therefrom, for the sake of clarity.

According to this invention, a device 10 is shown to include a mounting plate 11, having a central opening 12 defined by its two halves 13 and 14, for the freedom of travel of tubing or pipe, down and out of a well casing, (not shown). A plurality of openings 15, through mounting plate halves 13 and 14, receives a hold-down chain 16, which serves to fasten mounting plate 11 to the well head or blowout preventor and enables the removal of device 10, when desired. A pair of plates 17 are welded, at one side, to plate half 13, and overhang onto plate half 14, from edges 18 thereof, so as to receive pins 19 removably in their openings, (not shown). Pins 19 are fixedly secured to the top of plate half 14, and receive cotter keys 20, which render the plate halves 13 and 14 secured together. Three sleeves 21 are equally and radially spaced apart, and welded, at one end, to the tops of plate halves 13 and 14, and are telescopingly received within similar sleeves 21a, which are welded to the bottom of a top protector plate 22, which is composed of a pair of halves 23 and 24, having a plurality of handle grips 25 welded to their outer edges, so as to enable the users to carry device 10, when necessary. A spring loaded pin 21b, one of which is shown, is received transversely through sleeves 21 and 21a, so as to render them stationary together, thus enabling the whole assembly of device 10 to be lifted and transported together. A pair of plates 26 are similarly mounted to halves 23 and 24 of protector plate 22, as above-described of plates 17 of mounting plate 11, so as to receive removably pins 27 welded to half 24, and pins 27 receive cotter keys 28, so as to render plate halves 23 and 24 secure together.

Plate halves 23 and 24 also define a circular opening 29, therethrough plate 22, which aligns with opening 12 of mounting plate 11, so as to receive tubing or pipe freely, and a strap hinge 30, on top of each side of plate half 24, is fixedly secured thereto, by means of a plurality of suitable fasteners 31. The opposite side of hinges 30 are secured, by similar fasteners 31, to the top of a lift plate or door 32, which covers openings 33 through plate half 24. The lift plates or doors 32 include a handle grip 34, so as to lift plates 32, to view the counter units 35. Counter units 35, which are a pair, are secured to the tops of "T"-shaped mounting brackets 36 by screw fasteners 36a, which are received in openings 37, and the bottom of brackets 36 are fixedly secured to the top of plate half 14 by welding. The brackets 36 are angularly disposed to each other, and the pair of counter units 35, which read out by numerical characters in linear feet, are coupled, by flexible drive shafts 38, to a shaft 39 of one of the neoprene rubber wheels 40 of three tubing engaging assemblies 41. Three sets of guide rails 42 are parallel spaced-apart, and fixedly secured to the top of plate half 14 in a suitable manner (not shown), and serve as guides for the side edges of slide plates 43, having a cylindrical sleeve 44 integrally attached thereto, for freely and slidably receiving slide shafts 45, which are terminated, at one end, by a hand knob 46, that is used for a purpose which hereinafter will be described. A plurality of stud bolt fasteners 46a are received in openings 47 of plate halves 13 and 14, and are received in elongated slots 48 through slide plates 43, so as to receive nut fasteners 49. The bolt and nut fasteners 49 enable proper adjustment of the tubing engaging assemblies 41, with respect to movement horizontally toward, or away from, the center of device 10.

It shall be noted, that the three wheels 40 are positioned one hundred and twenty degrees, radially facing the center of device 10, so as to keep the tubing, being measured, centered in device 10.

A guide bar 50 is fixedly secured to each side of slide plates 43 in a suitable manner, and serves to support guide plate 51, which is suitably fixedly secured to the bottom of yoke 52. A pair of pillow blocks 52a are secured to yoke 52 by bolt fasteners 53, and pillow blocks 52a serve as bearings for the ends of shafts 39 of wheels 40. A scraper blade 54 slideably engages with the outer periphery of one of the wheels 40 at one end, and is secured to its yoke 52, by a screw fastener 55. Scraper blade 54 serves to remove any debris from one wheel 40, when device 10 is in use, and a coil spring 56 is received on all slide shafts 45, and one end of spring 56 urges against sleeve 44, and its opposite end urges against the end of the yokes 52. A brake rod 57 slideably engages with the sides of one of the wheels 40, and is secured by its ends 58 being received in openings of the sides of this particular yoke 52.

In use, the bottom or mounting plate halves 13 and 14 are joined together, by the pins 19 being received in the openings of the plates 17. The keys 20 are then received in the pins 19. The mounting plate 11 is then secured to the well head or blowout preventor by fastening the chains 16 thereto, in a suitable manner. After the above-mentioned, the slide plates 43 are adjusted to have the wheels 40 fit against the outer periphery of tubing to be measured, by loosening the nut fasteners 49, and either urging plates 43 inward or outward from the center opening 12 of mounting plate 11, after which, the fasteners 49 are again tightened. As the wheel 40 of the assembly 41, having the counter units 35 attached to its shaft, rotates on the tubing as it moves in the casing, one unit 35 measures the tubing when it lowers, and the other unit 35 measures the tubing when it is raised, and the compression springs 56 of assemblies 41 keep the wheels 40 thereof against the tubing at all times, and springs 56 further enable the yokes 52 and wheels 40, to retract simultaneously, as the tubing collars pass through device 10. The wheels 40 are also retracted manually by the knobs 46, so as to enable the operator to place the wheels 40 of the device 10 on the tubing. By pulling outwards on the knobs 46, the yokes 52 and their attached wheels 40 are moved against the pressure of the springs 56, and vertical movements of the tubing, both up and down, will be measured accurately, as the counter units 35 have both adding and subtracting capabilities.

It shall also be noted, that device 10 will also measure any tubing stretch, which occurs as the weight increases with each additional joint of tubing added to the tubing string. It shall also be recognized, that the protective plate halves 23 and 24 are joined together by the plates 26, through the use of pins 27, and cotter keys 28, in the same manner above-described of halves 13 and 14 of mounting plate 11. The protector plate 22 is received on top of device 10, by its sleeves 21a telescopingly receiving sleeves 21 of mounting plate 11, which then receives the spring loaded fastening pins 21b in the transverse openings of sleeves 21 and 21a. Plate 22 is also fastened to plate 11, only after the yokes 52 and wheels 40 are set for proper engagement with the tubing to be measured, and the operator lifts the doors 32 by the handle grips 34, to observe the counter units 35 readings.

While various changes may be made in the detail construction, it is understood that such changes will be within the spirit and scope of the present invention, as is defined by the appended claims.

I claim:

1. An automatic pipe tally device for measuring the length of a string of tubular members connected to one another by a collar, comprising in combination a mounting plate, a protective cover plate secured to said mounting plate, three tubing engaging assemblies secured to said mounting plate for holding said tubing being measured in the center of said measuring device, each of said tubing engaging assemblies including a rotatable wheel and a compression spring for pushing into engagement with said tubular member being measured, and a pair of linear footage counters secured to said mounting plate, said mounting plate and said protective cover plate being composed of two halves, defining a pair of central openings which encompass the tubing or pipe to be measured.

2. The combination according to claim one, wherein said three tubing assemblies are equally and radially spaced apart, and secured to said mounting plate by sliding mounting brackets held by bolt and nut fasteners to said mounting plate, and a freely rotatable neoprene rubber wheel in each said tubing engaging assembly rolls on the periphery of said tubing when said tubing is lowered or elevated in a well casing and said pair of counters are secured to said mounting plate by mounting brackets, bolts and nut fasteners and are each coupled to each end of the shaft of one of said wheels of one said tubing engaging assemblies by flexible driveshafts, said counters reading out the feet of tubing being lowered or elevated in said well casing.

* * * * *